March 27, 1928.

A. E. DALY 1,664,162

DIRIGIBLE HEADLIGHT FOR AUTOMOBILES

Filed June 23, 1927

INVENTOR.
ARNOLD. E. DALY.

BY Featherstonhaugh & Co.

ATT'YS.

Patented Mar. 27, 1928.

1,664,162

UNITED STATES PATENT OFFICE.

ARNOLD EDGAR DALY, OF MATHER, MANITOBA, CANADA.

DIRIGIBLE HEADLIGHT FOR AUTOMOBILES.

Application filed June 23, 1927. Serial No. 200,920.

This invention relates to improvements in dirigible headlights for automobiles and the primary object of the invention is to provide an arrangement whereby the headlights will be automatically turned as the vehicle is steered to direct the rays of the lights in the path of the vehicle and also whereby the headlights may be tilted, when turned, independently of the automatic steering and turning mechanism.

Further objects are the provision of pedal-operated mechanism, controlled from the driver's seat, for tilting the headlights vertically to throw the rays of light at many different angles on the road.

Another object of the invention is to generally improve upon headlights and mounting means therefor by the provision of a practical and simplified structure wherein the lights may be turned to follow the direction in which the vehicle is travelling and whereby they may be also and separately operated to be tilted to any required angle.

Other objects and advantages of the invention will be apparent during the course of the following description.

The invention consists essentially in the combination with the steering gear, of headlights pivotally mounted on rotatable standards, and means for operatively connecting the headlights with the steering mechanism whereby, on the latter being operated, the headlights are automatically turned in the direction in which the vehicle is travelling, and mechanism separate from the steering mechanism and operable from the driver's seat for tilting said headlights.

Referring now to the drawings, in which like characters of reference indicate corresponding parts in each figure, Figure 1 is a perspective view of the turning and tilting mechanism for the headlights, the dotted lines showing the frame of an automobile.

Figure 4:
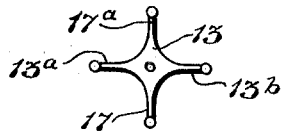
Figure 4 is a plan view of the plate member.
Figure 2:
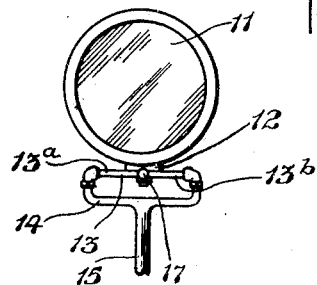
Figure 2 is a front view of the headlight with ball and socket mountings.
Figure 3:
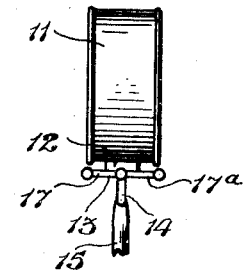
Figure 3 is a side view of Figure 2.
Figure 1:
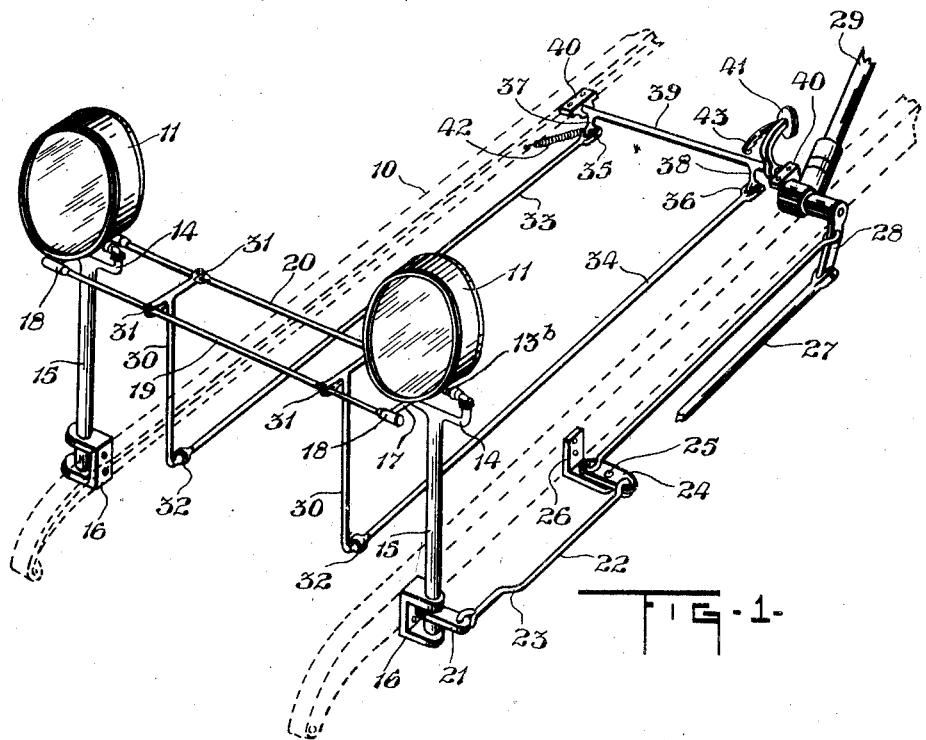

Referring now more particularly to the drawings, in which a preferred example of my invention is illustrated, 10 indicates the frame of the vehicle, such as an automobile. 11 are the headlights, of any well known construction, rigidly secured through a spacer 12 by bolts or the like to a plate 13, the arms 13$^a$ and 13$^b$ of which are ball and socket connected to each end of a forked supporting member 14 rigidly connected to the standards 15 in turn rotatably supported in brackets 16 rigidly secured to the frame 10 and provided with ball bearings or the like.

In order that the headlights may be simultaneously operated, the arms 17 and 17$^a$ of the plate 13, are ball and socket connected, as at 18 to parallel spaced cross rods 19 and 20, so that when one of the standards 15 is rotated, as hereinafter more fully described, the headlights will automatically and concurrently turn therewith and as this operation co-ordinate with the direction in which the car is being steered the headlights follow the same course.

For operating the standards 15, I provide an arm 21 on the lower end thereof and rigidly secured thereto. The outer end of this arm is designed to engage with a rod 22 having an offset 23 thereon. The other end of this arm engages with a lever 24 pivotally mounted at 25 on an L-shaped bracket 26 rigidly secured to the frame 10, the inner end of the lever 24 being connected by a rod or link 27 to the steering arm 28, so that on the steering gear being operated through the steering column 29 the lamp posts or standards 15, and with them the headlights, are turned in the direction in which the automobile is travelling.

For tilting the headlights I provide T-shaped rods 30 pivotally connected, as at 31, to the cross rods 19 and 20, their stem ends being ball and socket connected, as at 32, to the longitudinally extending rods 33 and 34 clevis connected at 35 and 36 to arms 37 and 38 on a cross rod 39 pivotally supported in bearings 40 on each side of the frame and operable by means of a foot pedal 41 and spring held thereto by means of a coil spring 42 connected on its outer end to the frame, so that on the pedal 41 being pressed the rod 39 will rotate, operating the rods 19 and 20 and through them the T-shaped rods 30 to cause the pivotally mounted ball and socket supported headlights to tilt downwardly and thus obviate glare without dimming the light.

The arcuate toothed arm 43 attached to the pedal 41 is designed in operation to engage the footboard of the car, and thus the headlights may be locked in a tilted position of any desired degree.

As many changes could be made in the above construction, and many apparently widely different embodiments of my invention, within the scope of the claims constructed without departing from the spirit or scope thereof, it is intended that all matter contained in the accompanying specification and drawings shall be interpreted as illustrative and not in a limiting sense.

What I claim as my invention is:

1. A dirigible headlight for motor vehicles comprising a rotatably mounted standard, forked lamp supporting arms unitary with the standard, a substantially star-shaped plate pivotally connected to the arms, a headlight rigidly secured on said plate, spaced parallel cross-rods operatively connected to said plate, means operable from the driver's seat for operating the cross-rods to tilt the headlights, and means simultaneously operable with the steering mechanism for turning the headlights with the wheels of the vehicle.

2. In a device of the character described the combination with the steering mechanism, of turnably mounted standard members operable therewith, headlights, supporting plates for the headlights provided with a plurality of spaced arms and rigidly connected to the headlights, spaced arms integral with the standards pivotally connected to said plates, and parallel spaced cross-rods pivotally connected to said plate whereby the headlights are tiltable, means for automatically retaining the spaced parallel rods in horizontal position, and means operable from without for operating said rods to tilt the headlights.

In witness whereof I have hereunto set my hand.

ARNOLD EDGAR DALY.